(12) United States Patent
Poland

(10) Patent No.: US 6,582,372 B2
(45) Date of Patent: Jun. 24, 2003

(54) ULTRASOUND SYSTEM FOR THE PRODUCTION OF 3-D IMAGES

(75) Inventor: Mckee D Poland, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 5 days.

(21) Appl. No.: 09/888,185

(22) Filed: Jun. 22, 2001

(65) Prior Publication Data

US 2003/0013955 A1 Jan. 16, 2003

(51) Int. Cl.⁷ .............................. A61B 8/12; A61B 8/00
(52) U.S. Cl. ........................................ 600/463; 600/445
(58) Field of Search ................................. 600/437–472; 345/419, 424; 128/916

(56) References Cited

U.S. PATENT DOCUMENTS 5,581,671 A * 12/1996 Goto et al. .................. 345/419
5,766,129 A * 6/1998 Mochizuki .................. 128/916
5,793,375 A * 8/1998 Tanaka ........................ 345/424
6,443,896 B1 * 9/2002 Detmer ........................ 600/445

FOREIGN PATENT DOCUMENTS

EP 1046929 A2 10/2000 ........... G01S/15/89

* cited by examiner

Primary Examiner—Marvin M. Lateef
Assistant Examiner—Ruby Jain
(74) Attorney, Agent, or Firm—John Vodopia

(57) ABSTRACT

An ultrasound system that utilizes a probe in conjunction with little or no specialized 3-D software/hardware to produce images having depth cues. A control unit uses the probe to produce multiple slices of data, wherein each slice has a plurality of lines of data points. The control unit oversees the combination of data points from matched lines across the slices so as to create an image on the display giving the illusion of depth.

38 Claims, 5 Drawing Sheets

ULTRASOUND SYSTEM FOR THE PRODUCTION OF 3-D IMAGES

BACKGROUND OF THE INVENTION

In general, an ultrasound system emits pulses over a plurality of paths and converts echoes received from objects on the plurality of paths into electrical signals used to generate ultrasound data from which an ultrasound image can be displayed. The process of obtaining the raw data from which the ultrasound data is produced is typically termed "scanning," "sweeping," or "steering a beam". In most ultrasound systems, scanning is rapidly repeated using an ultrasound transducer assembly so that many images maybe acquired within a second of time.

Ultrasound transducer assemblies comprise transducer elements, typically with damping and matching materials, that when excited by an electrical pulse emit ultrasound pulses and receive echoes. Transducer assemblies are packaged with associated electronics and connections in a housing that facilitates examination. Taken as a whole, such a combination (the transducer assembly, electronics, connections, and housing) is typically referred to as an ultrasound probe (or simply just "probe"). In general, modern probes are classified as either 1-D probes (having a single element wide array) or 2-D probes (having a multi-dimensional array of elements). Other types of probes do exist, such as bi-plane probes (having two 1-D arrays for scanning on two different planes).

Ultrasound data is typically acquired in frames, each frame representing a sweep of an ultrasound beam emanating from the face of a transducer. 1-D transducers produce 2-D rectangular or pie-shaped sweeps, each sweep being represented by a series of "lines" of data points. Each of the data points are, in effect, a value representing the intensity of an ultrasound reflection at a certain depth along a given line. Newer 2-D transducers are capable of producing sweeps forming a set of data points describing pre-defined 3-D shapes (typically referred to as a "volume scan").

Real-time sonography refers to the presentation of ultrasound images in a rapid sequential format as the scanning is being performed. Scanning is either performed mechanically (by physically oscillating one or more transducer elements) or electronically. By far, the most common type of scanning in modern ultrasound systems is electronic wherein a group of transducer elements (termed an "array") arranged in a line are excited by a set of electrical pulses, one pulse per element, timed to construct a sweeping action.

In a linear sequenced array, an aperture is swept across the array by sequentially exciting overlapping sub-groups of transducer elements. In a linear phased array, all (or almost all) the elements are excited by a single pulse, but with small (typically less than 1 microsecond) time differences ("phasing") between adjacent elements, so that the resulting sound pulses pile up along a specific direction (termed "steering"). In addition to steering the beam, the phased array can focus the beam, along the depth direction, by putting curvature in the phase delay pattern. More curvature places the focus closer to the transducer array, while less curvature moves the focus deeper. Delay can also be used with a linear sequenced array to provide focusing. Conversely, upon reception of echoes, delays are used to time the sampling of the raw points of data from which ultrasound image data is produced.

The apparatus that creates the various delays is called a beamformer. Known beamformers have traditionally operated in the analog domain employing expensive circuits capable of delivering a new point of data (dynamically delayed) every nano-second. More recently, digital beamformers have been developed, that provide delay by buffering A/D converted transducer output in a digital memory and varying the read times therefrom. Known digital beamformers are capable of delivering a new point of data at least every 25 nano-seconds.

To produce 3-D images a volume of ultrasound data (a 3-D scan data set) must be created, either by scanning or scanning with interpolation. This volume of data is then processed to create an image for display on a 2-D surface that has the appearance of being 3-D. Such processing is typically referred to as a rendering.

One method to generate real-time 3-D scan data sets is to perform multiple sweeps wherein each sweep oriented to a different scan plane. The scan lines of every sweep are typically arrayed across the probe's "lateral" dimension. The planes of the successive sweeps in a frame are rotated with respect to each other, e.g. displaced in the "elevation" direction, which is typically orthogonal to the lateral dimension. Alternatively, successive sweeps may be rotated about a center line of the lateral dimension. In general, each scan frame comprises a plurality of lines allowing the interrogation of a 3-D scan data set representing a scan volume of some pre-determined shape, such as a cube, frustum, or cylinder.

While some 3-D optimized ultrasound systems are available, most commercial ultrasound systems today display only planar 2-D images, acquiring scan data from one-dimensional array probes. The SONOS 5500 sold by AGILENT TECHNOLOGIES, Inc. is one example of one such system. Some commercial systems, including the SONOS 5500, can generate 3-D ultrasound images with the help of "off-line" post-processing. To do this, sequences of regularly spaced planar 2-D sweeps are collected as the position of the probe is translated or rotated in some way between scan frames. Post-processing manipulation reconstructs 3-D data sets using acquired position information for each 2-D scan plane. The resulting 3-D data sets are displayed as rendered images, typically on a separate workstation, using any of various well-known, computation-intensive rendering techniques. Furthermore, the real-time rendering and display workstation may be integrated with the ultrasound scanner into one system, for example VOLUMETRICS, Inc. produces such a system.

One enabling technologies for real-time 3-D is the development of probes having a transducer assembly comprising a matrix of elements (for example a 56×56 array of 3,136 elements), sometimes referred to a 2-D probe. Because 2-D probes allow beam steering in two dimensions as well as the aforementioned focus in the depth direction, there is no need to physically move the probe to translate focus for the capture of a volume of ultrasound data to be used to render 3-D images.

When a series of scan frames are acquired, each containing multiple scan planes, the resulting 3-D data sets may include another dimension, time, indexed by relative time or frame number. Such time or frame indexed data sets are referred to as "4-D data sets," and can be used to produce moving 3-D images on the offline workstation. If the full time-sequence of 3-D images derived from the 4-D data sets are pre-calculated for a given set of viewing parameters (viewing angle, opacity, perspective, etc.), then the moving 3-D image display can be rendered at the "live" frame rate, that is, the rate at which the scan frames were acquired.

Given a probe whose scan beams can be electronically steered/focused in three dimensions (e.g., employing a 2-dimensional element array), and a sufficiently potent rendering system, 4-D data sets may be acquired and rendered not only at the "live" frame rate but also in real-time, where the acquisition, rendering, and display are done simultaneously.

Currently, 3-D systems occupy a relatively small market niche. It has proven difficult to convince users to replace their existing 2-D systems, most of which are quite expensive, with an even more costly 3-D based system that sometimes sacrifices resolution and clarity for the illusion of depth. Accordingly, the Inventor has identified a need to develop a 3-D capable ultrasound imaging system based on current commercial ultrasound systems that doesn't require the addition of significant hardware, such as a 3-D workstation. Such a solution could be supplied to the user as a low cost upgrade to a current 2-D system.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1:
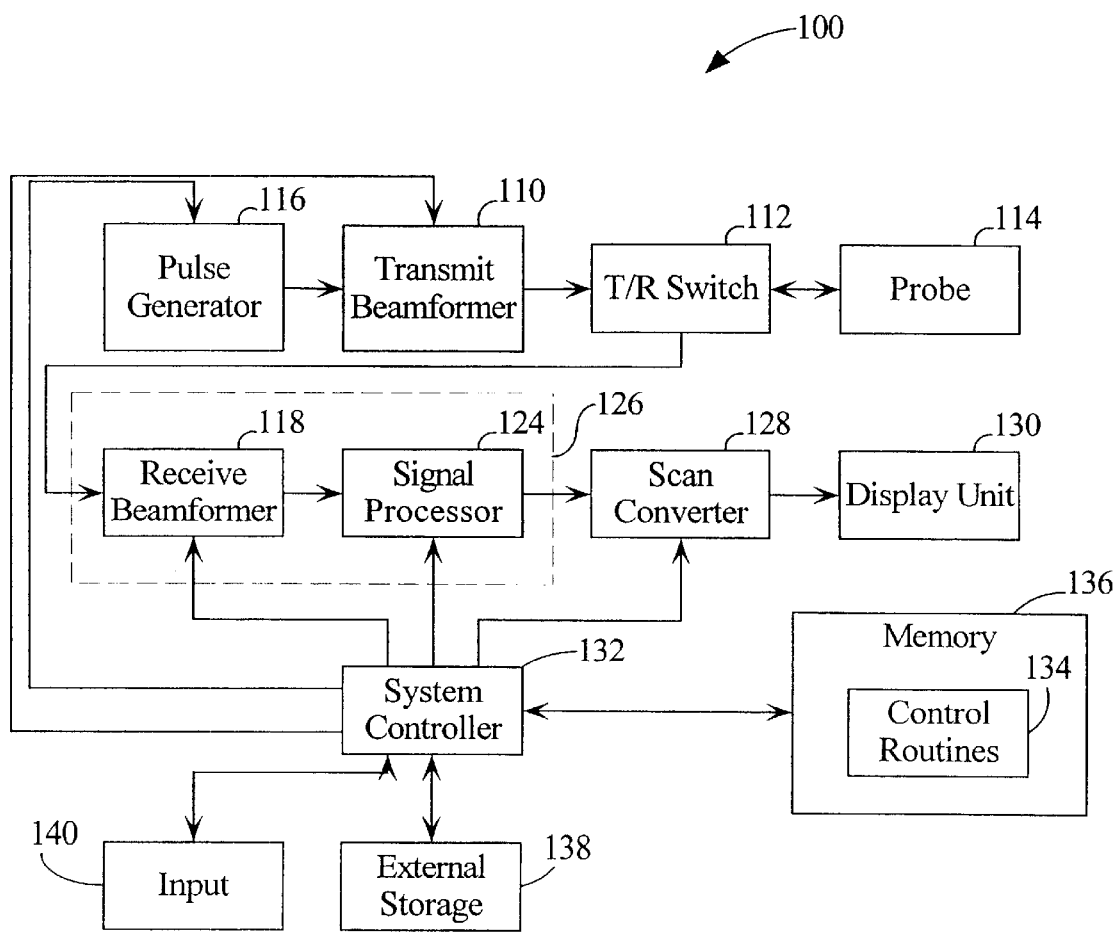
FIG. 1 is a simplified block diagram of an ultrasound imaging system 100 in accordance with preferred embodiments of the present invention

Reference will now be made in detail to the present invention, examples of which are illustrated in the accompanying drawings, wherein like reference numerals refer to like elements throughout.

In the present case, the presented methods are machine operations to be performed in conjunction with human operators. Useful machines for performing the operations of the present invention include the Agilent Technologies SONOS 5500 and other similar devices. In general, the present invention relates to method steps, software, and associated hardware including computer readable medium, configured to store and/or process electrical or other physical signals to generate other desired physical signals.

The apparatus set forth in the present application is preferably specifically constructed for the required purpose, i.e. ultrasound imaging, but the methods recited herein may operate on a general purpose computer or other network device selectively activated or reconfigured by a routine stored in the computer and interface with the necessary ultrasound imaging equipment. The procedures presented herein are not inherently related to any particular ultrasonic system, computer or other apparatus. In particular, various machines may be used with routines in accordance with the teachings herein, or it may prove more convenient to construct more specialized apparatus to perform the required method steps. In certain circumstances, when it is desirable that a piece of hardware possess certain characteristics, these characteristics are described more fully in the following text. The required structures for a variety of these machines may appear in the description given below. Machines which may perform the functions of the present invention include those manufactured by such companies as AGILENT TECHNOLOGIES, PHILIPS MEDICAL SYSTEMS INTERNATIONAL, GE MEDICAL SYSTEMS, and SIEMANS MEDICAL SYSTEMS, as well as other manufacturers of ultrasound equipment.

As used herein the term slice comprises a set of scan lines, typically but not necessarily co-planar, taken during a single sweep of the ultrasound beam. A scan frame comprises one or more slices wherein the scan frame rate is typically the same as the display update rate.

FIG. 1 is a simplified block diagram of an ultrasound imaging system 100 in accordance with preferred embodiments of the present invention. It will be appreciated by those of ordinary skill in the relevant arts that the ultrasound imaging system 100, as illustrated in FIG. 1, and the operation thereof as described hereinafter is intended to be generally representative such systems and that any particular system may differ significantly from that shown in FIG. 1, particularly in the details of construction and operation of such system. As such, the ultrasound imaging system 100 is to be regarded as illustrative and exemplary and not limiting as regards the invention described herein or the claims attached hereto.

A transmit beamformer 110 is coupled through a transmit/receive (T/R) switch 112 to a probe 114 which, but not necessarily, has a 2-D transducer array having a plurality of transducer elements arranged across two dimensions. In any event the probe 114 is preferably able to scan a volume with the proper support from the ultrasound imaging system 100. The T/R switch 112 typically has one switch element for each transducer element or the probe 114 may have multiplexing circuitry, sub-array beamforming or the like, to reduce the number of leads between the T/R switch 112 and the probe 114, reducing the required number of switches. The transmit beamformer 110 receives pulse sequences from a pulse generator 116. The probe 114, energized by the transmit beamformer 110, transmits ultrasound energy into a region of interest (ROI) in a patient's body and receives reflected ultrasound energy, or echoes, from various structures and organs within the patient's body. As is known in the art, by appropriately delaying the waveforms applied to each transducer element by the transmit beamformer 110, a focused ultrasound beam may be transmitted.

The probe 114 is also coupled, through the T/R switch 112, to a receive beamformer 118. Ultrasound energy from a given point within the patient's body is received by the transducer elements at different times. The transducer elements convert the received ultrasound energy to transducer signals which may be amplified, individually delayed and then accumulated by the receive beamformer 118 to provide a beamformer signal that represents the received ultrasound levels along a desired receive line ("scan line" or "beam"). The receive beamformer 118 may be a digital beamformer including an analog-to-digital converter for converting the transducer signals to digital values. As known in the art, the delays applied to the transducer signals may be varied during reception of ultrasound energy to effect dynamic focusing. The process is repeated for multiple scan lines to create a frame of data for generating an image of the region of interest in the patient's body. The receive beamformer 118 may, for example, be a beamformer of the type used in the AGILENT SONOS 5500 ultrasound system manufactured and sold by AGILENT TECHNOLOGIES.

In an alternative system configuration, different transducer elements are used for transmitting and receiving. In that configuration, the T/R switch 112 is not required, and the transmit beamformer 110 and the receive beamformer 118 are connected directly to the respective transmit and receive transducer elements.

The beamformer signals are applied to a signal processor 124 which processes the beamformer signal for improved image quality and may include routines such as detection, filtering, persistence and harmonic processing. The receive beamformer 118 and the signal processor 124 constitute an ultrasound receiver 126. The output of the signal processor 124 is supplied to a scan converter 128 which converts sector scan or other scan pattern signals to conventional raster scan display signals. The output of the scan converter 128 is supplied to a display unit 130, which processes the scan converted data so as to display an image of the region of interest in the patient's body.

A system controller 132 provides overall control of the system. The system controller 132 performs timing and control functions and typically includes a microprocessor operating under the control of control routines 134, stored in a memory 138. As will be discussed in detail below, the control routines 134 include a variety of routines that modify the operation of the ultrasound receiver 126 so as to produce a 3-D image without dedicated rendering hardware. The system controller 132 also utilizes a memory 136 to store intermediate values, including system variables describing the operation of the ultrasound imaging system 100. External storage 138 may be utilized for more permanent and/or transportable storage of data. Examples of devices suitable for use as the suitable external storage 138 include a floppy disk drive, a CD-ROM drive, a videotape unit, etc. An input unit 140 provides an operator interface using a combination of input devices, such as keys, sliders, switches, touch screens and track ball.

The present inventor has discovered two low cost modifications to a standard ultrasound imaging system, equipped with a probe, that allow the presentation of depth information. One modification provides a standard 2-D like sector view having depth cues, while the second modification provides a C-scan like view having depth cues.

Figure 2:
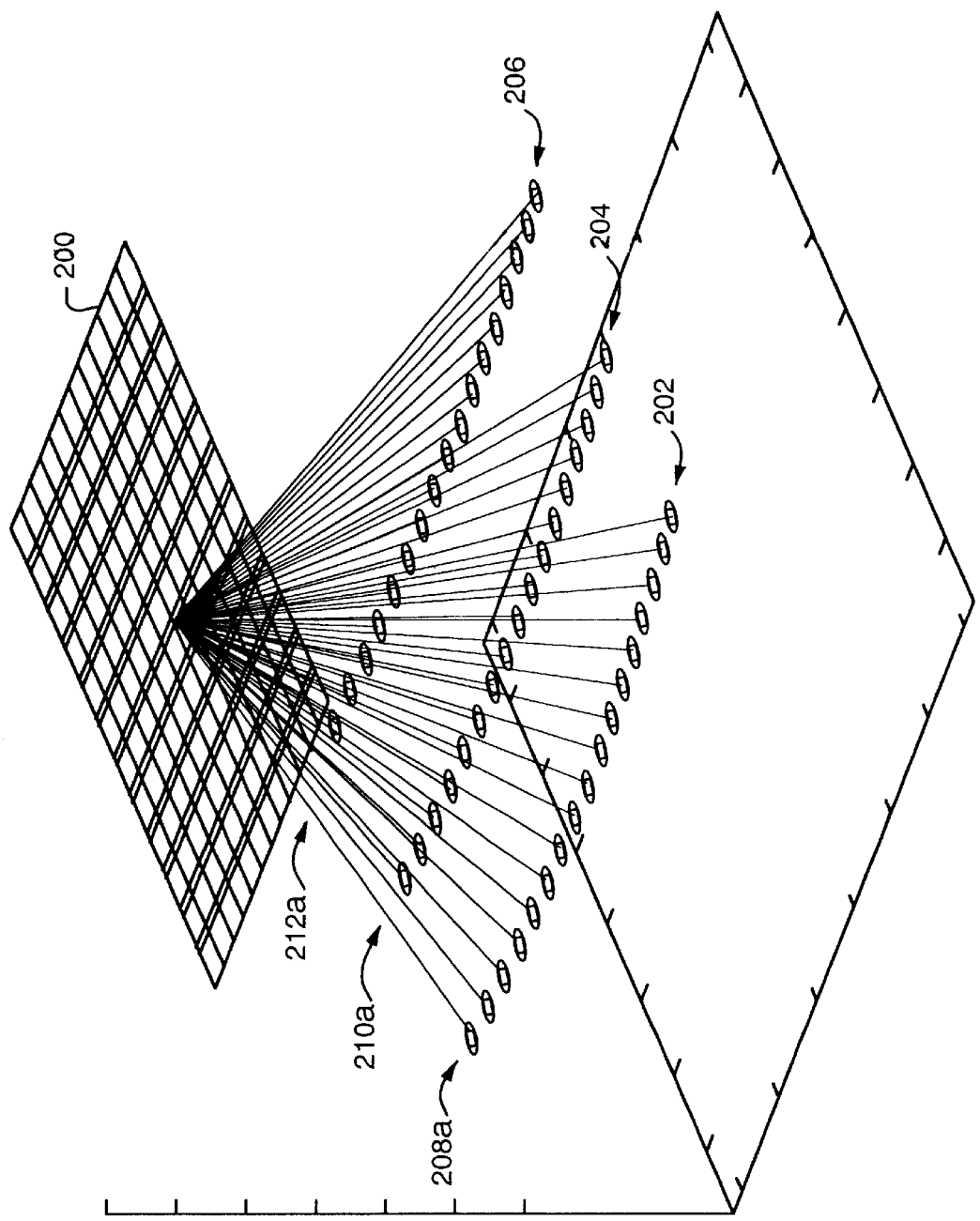
FIG. 2 is a chart of a scan of a frame of data obtained in accordance with a first preferred embodiment of the present invention.

FIG. 2 is a chart of a scan of a single frame of data obtained in accordance with a first preferred embodiment of the present invention. FIG. 2 shows a 2-D probe 200 acquiring three slices 202, 204, and 206. In general, each slice 202, 204 and 206 comprises a series of lines 208n, 210n and 212n, respectively. Exemplary lines 208a, 210a, and 212a are labeled for ease of explanation. In this case, each slice is in the shape of a sector, and the apexes of the sectors are at the middle of the 2-D probe 200. In effect, each slice 202, 204, and 206 represents a traditional 2-D sweep, with each sweep being displaced in elevation from the neighboring sweep. Those of ordinary skill in the art will recognize that while the probe 200 is shown as a 2-D probe, other types of probes may be used. For example a multidimensional array probe (such as a curved 2D array), a mechanical wobbler or even a manually or mechanically translated linear array could be used to obtain the necessary slices.

Those of ordinary skill in the art will also recognize that trapezoidal or parallelogram shapes can be generated for each of the slices instead of sectors. The number of lines per slice can also be varied. Further, the apex, or origin, of each line may vary from line to line, from slice to slice, or both. But for simplicity, the slices 202, 204 and 206 are represented as sectors, all with the same apex, and all the lines have a common origin, with the rotation from slice to slice being about the lateral axis through the center of the probe face.

In the example shown in FIG. 2, there are three slices 202, 204 and 206 conjoined at a single apex but otherwise separated in elevation. Each of the scan lines 208n, 210n and 212n in each of the slices 202, 204, and 206, respectively, has a matching (or "indexed") scan line in the other slices. Preferably, scan lines with the same lateral position are matched across the set of slices. For example, scan line 208a in slice 202 is matched with scan line 210a in slice 204 and scan line 212a in slice 206. One way to accomplish this is to index each scan line in a slice by numbering them in sequence. Then scan lines having the same index value can be easily matched.

In accordance with the preferred embodiments of the present invention is simply preferably to match proximate scan lines, for example those lines that are within say six scan lines of displacement. Such displacement can be accomplished by adding an offset value to the index of the scan line. Accordingly, the term "matched lines" refers to a set of lines, preferably one from each slice used to create the composite image, that have some predefined proximate relationship such as sharing an index value (with or without offsets).

To render a 3-D image, the data points on each of sets of matched scan lines are linearly combined using an addition routine. In other words, each slice in the set of slices is accumulated in the elevation direction to produce an aggregate slice for subsequent display. Preferably, but not necessarily, the data points in each slice are weighted, for example on a line by line basis, by using a multiply and accumulate routine (also known as a "MAC"). For example, the data points in the foremost line in each matched set of scan lines might get the highest weighting to emphasize the view point of the image as discussed herein below. Further, the weighting need not be constant from matched set to matched set. For example, data points in the matched sets in the middle region could be weighted more evenly than data points in the matched set in the outside regions to compensate for some aberration in the acoustic performance of the probe 200. The set of all weighted, accumulated matched sets produces an aggregate slice that is the composite of the original three slices 202, 204 and 206.

Figure 3:
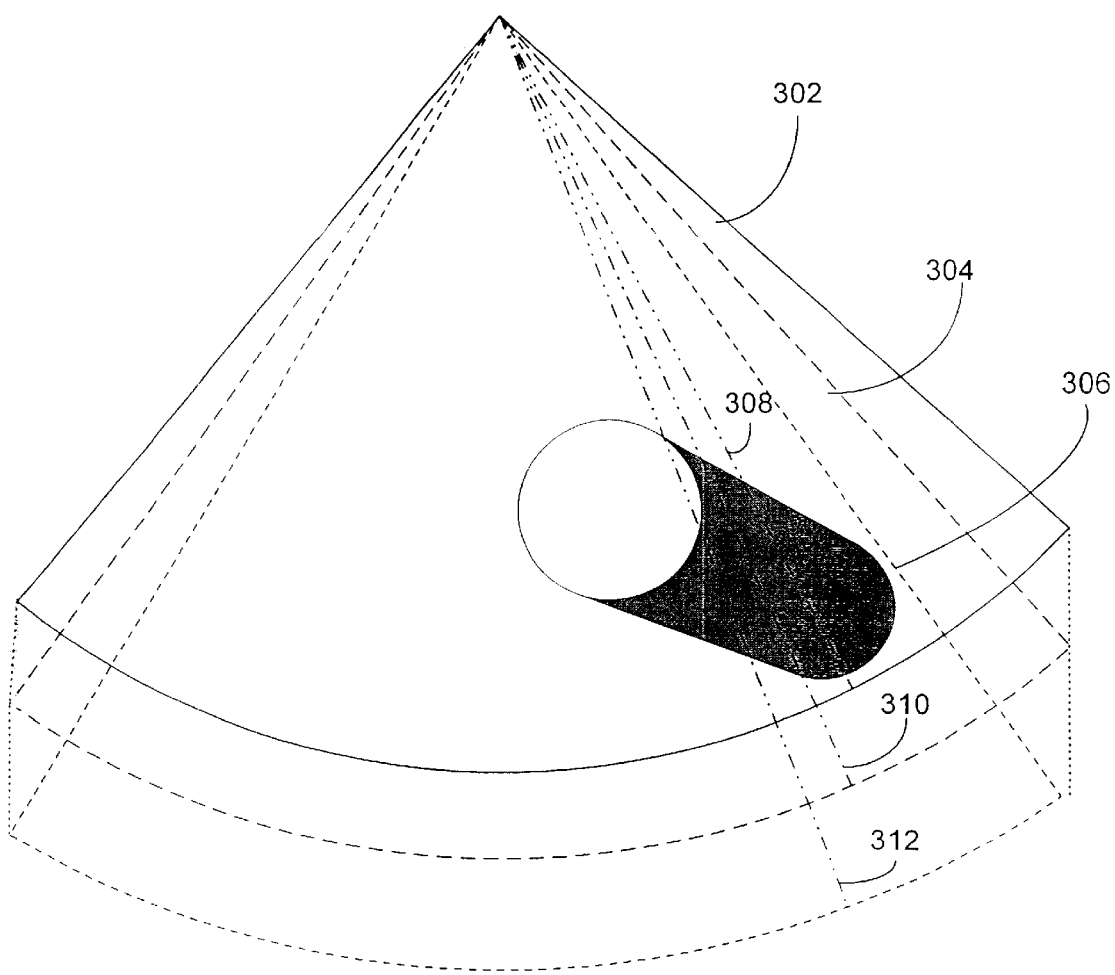
FIG. 3 is a graphical representation of slices of ultrasound data obtained using the method shown in FIG. 2.

FIG. 3 is a graphical representation of slices of ultrasound data obtained using the method shown in FIG. 2. FIG. 3 is a conceptual drawing showing three imaged slices 302, 304, and 306 and their approximate spatial relationships. Three matched lines of data, 308, 310, and 312 are portrayed. In accordance with the present invention, the various values in the three imaged slices 302, 304, and 306 would be accumulated (or weighted and accumulated) to produce an image that provide depth cues to the viewer. To be specific, the values of data points on each set of matched lines (for example lines 308, 310, and 312) that are indexed together, preferably by depth, will be accumulated (or weighted and accumulated) and used to create a new line for use in a display image.

Figure 4A:
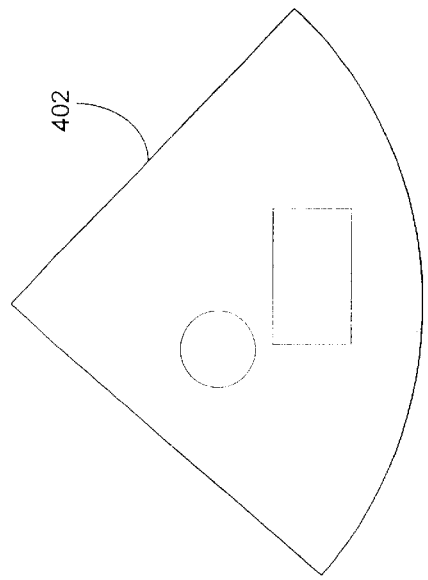
FIGS. 4A through 4D are representations of slices of ultrasound data obtained and generated in accordance with the first preferred embodiment of the present invention.
Figure 4B:
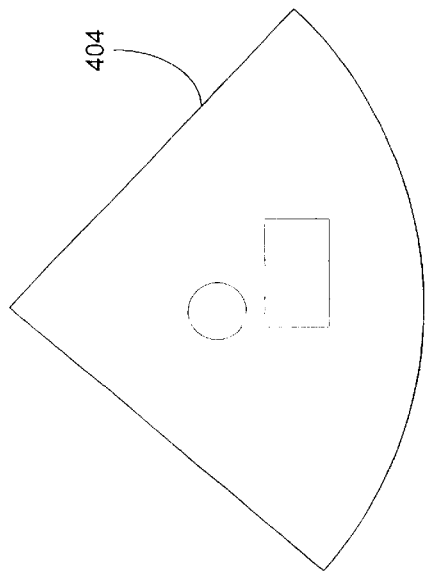
Figure 4C:
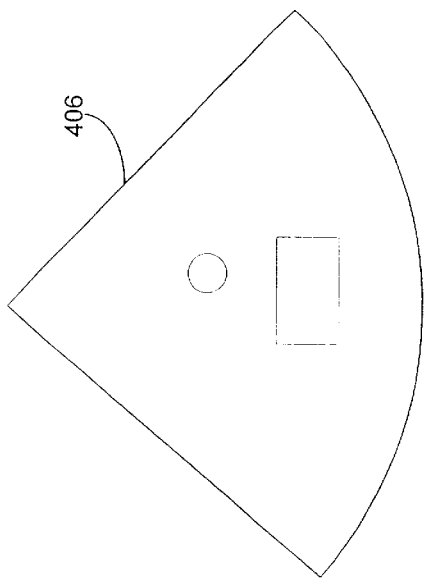
Figure 4D:
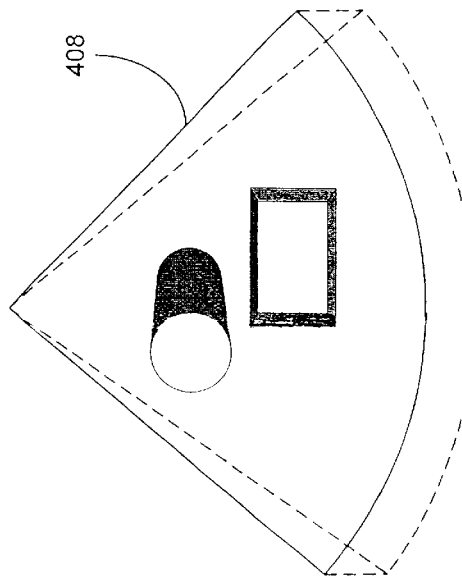

FIGS. 4A through 4C are representations of slices of ultrasound data obtained in accordance with the first preferred embodiment of the present invention. FIGS. 4A, 4B, and 4C represent three slices 402, 404 and 406 of two three dimensional objects. FIG. 4D is a representation of a slice 408 as produced in accordance with the present invention by weighted accumulation of the acoustic intensity samples of matched data points on lines at the same index of the slices 402–406 shown in FIGS. 4A, 4B, and 4C. When combined into a single slice, e.g. slice 408 in FIG. 4D, 3-D depth can be perceived.

The number of slices obtained and used to produce the resultant image is largely dependant on a desired frame rate, but is preferably between 3 and 15. More preferably, the number of slices gathered is between 6 and 12. Using 3 slices as an example, the slices may be gathered at 5° offsets in elevation and each within a single scan frame. This should result in a slice rate above 30 Hz, giving good temporal coherence.

In accordance with the first preferred embodiment of the present invention, multiple scan slices are taken in each scan frame wherein the 3-D position of each slice is not necessarily chosen to produce a regularly spaced plane for a volume shape, as in standard 3-D/4-D imaging. Instead, the scan slices are oriented to be optimized for the generation of a 3-D image at a desired viewing angle. Rendering on a frame-by-frame basis is reduced to a simple weighted addition of the acoustic intensity samples of the lines at the same index in successive slices. The result is a view, such as the view shown in FIG. 4D, produced without the complexity of a rendering workstation.

The apparent viewing angle of the resultant 3-D image, such as is shown in FIG. 4D, is principally determined by the orientation of the slices (and the lines within those slices) in the scanning sequence. The rendering process is static and therefore simple: weighted accumulation (using, for example, a MAC) of matched lines, e.g. lines having a same index value in successive slices of the scan. To change the viewing angle of the image, the scan slices are re-oriented (and potentially the scan lines within those slices). The re-orienting of scan lines and slices requires recalculation of focus and steering coefficients in the beamformer (beamformer 118 in FIG. 1). Thus, beamforming calculation time is traded off against the calculation time of rendering matrices.

Image rotation can be accomplished modifying the line index (e.g. adding an offset) after acquisition, for example incrementing or decrementing line index values by the slice sequence number from slice to slice. The composite image would show a rotation forward or backward about the center axis of the slice set. In other words, by stepping the line indexes forward on each successive slice, the lines accumulated into the projection plane are shifted laterally across slices, creating a rotation of the resulting image. Alternatively, the line indexing could be kept regular (no line index shifting across slices), and instead the acoustic positions of the lines themselves could be adjusted to produce the same rotations having a finer angular resolution.

One benefit of the present invention is that existing hardware and software can be easily modified to produce the required images. For example, using persistence, already available on the SONOS 5500, images in accordance with the present preferred embodiment can be produced without any changes to the hardware. Persistence produces a temporal smoothing of an image across frames, to hide the effects of acoustic noise (such as reverberation), thermal noise in the system electronics, and moving clutter.

The present inventor has discovered that persistence can be employed for a different purpose: to produce an image with a depth component. Persistence works by averaging weighted line data from the same scan line in successive frames, favoring the most recently scanned lines by using a higher weight in the average. Accordingly, by using persistence for indexed scan lines across slices the present invention may be achieved.

Referring to FIG. 1, the averaging step for persistence is usually performed by the signal processor 124 prior to scan conversion in the scan converter 128. Simple reprogramming of the signal processor 124 can create a persistence routine in accordance with the present invention. Alternatively, the system controller 132 can be programmed to perform the linear combination or to utilize the existing persistence routine in the signal processor 124 in accordance with the present invention. In yet another alternative, data from the beamformer 118 can be transmitted to a standard PC (not shown) for processing in accordance with the present invention. While more costly, the PC solution may be an easier upgrade path while avoiding costly rendering software and/or dedicated rendering hardware.

In the simplest implementation, scan slices within a frame are regularly spaced in the elevation dimension, such that there is no lateral line shift from slice to slice. During rendering, the lines of each slice are weighted and added to their indexed lines in the other slices using descending weights from one end of the slice sequence to the other. The resulting 3-D image presents a viewing angle as though the viewer were directly in front of the slice and at an infinite distance. The front slice (defined to be the one with the highest weighting) is most prominent, while the slices behind the front slice are faded, which gives the cue of depth to the viewer by creating a dimming effect. A structure in the scanned medium which crosses lateral line boundaries and extends back in the elevation dimension will appear to fade back in the distance the farther it is from the front slice.

Because the simple rendered view in accordance with the present invention is an orthographic projection, it does not include any scaling for depth perspective. That is, structures further from the front slice will not be scaled smaller as they would be in a real 3-D view. Because of this distortion, the total depth and thus the total number of slices should be limited so that the image has a high width-to-depth ratio. This has been referred to as a "clam-shell" 3-D image. In a typical 3-D ultrasound scan, even rendered with perspective and arbitrary views, a limited amount of depth information can be recognized and processed by the mind of the user. Accordingly, images presented in accordance with the present invention may provide just as much recognizable depth component as fully rendered 3-D images.

Reproducing perspective and parallax effects improves the representation of arbitrary volume shapes and viewing angles. Such effects can be readily achieved by varying placement of the acoustic lines and slices in the scan frame. For example, the effective viewing angle can be changed by simply offsetting each successive slice in the lateral dimension. The rendering process can be modified to add weighted lines that extend not just back in the elevation dimension but also to the side. The arctangent of the lateral slice shift distance divided by the elevation slice step distance is the effective viewing angle.

Although a few enhancements to the first preferred embodiment of the present invention have been described, it will be appreciated by those skilled in the art that other changes may be made without departing from the principles and spirit of the invention, the scope of which is defined in the claims and their equivalents. For example, the scan slices could be parallel instead of having a common apex. Parallel slices could be produced using beamforming coefficient algorithms that place the scan line origins along parallel (or nearly parallel) lines. With parallel slices, the depth of the rendering is constant across the whole image, instead of thinning to a point at the apex. Changing the weights of the scan lines in the rendering addition could emphasize or de-emphasize the contributions of slices, allowing the amplification or even isolation of particular viewed depths. Some parameters, such as elevation step, number of slices to combine, and slice weighting profile, could be user-controlled individually or via recipes or presets. The slice weighting profile could be varied as a function of depth to compensate for the variation in elevation separation with depth in scans of slices that have a common apex. Further, a non-linear filter, such as an IIR or adaptive filter, can be used instead of a MAC. By way of example, one possibility is the use of a look-up table containing filter coefficients for each intensity value. A non-linear adaptive filter using an intensity accumulation function with clipping at a user specified maximum would provide a controllable opacity of structures that span the accumulation slices.

Figure 5:
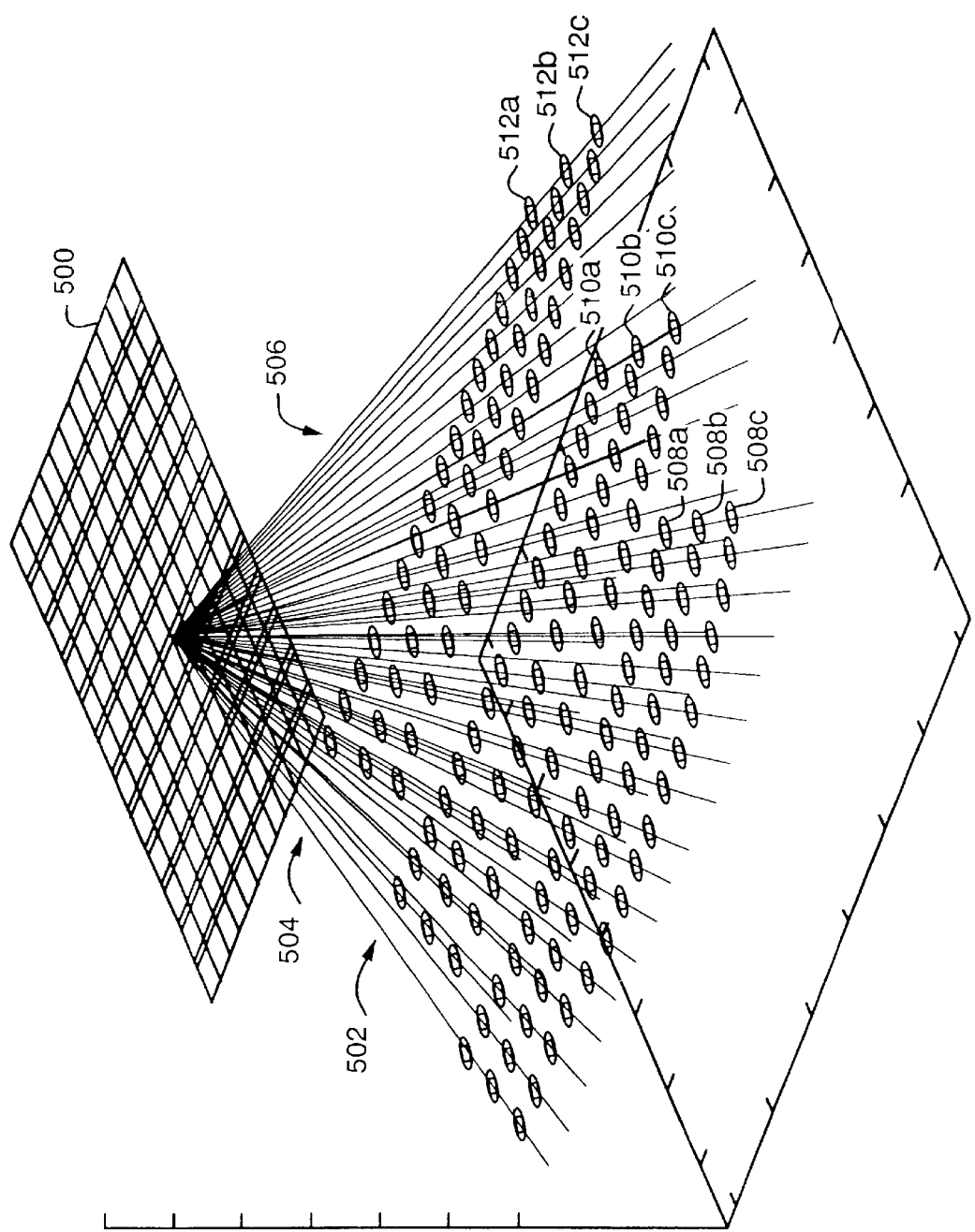
FIG. 5 is a chart of a scan of a frame of data obtained in accordance with a second preferred embodiment of the present invention.

FIG. 5 is a chart of a scan of a frame of data obtained in accordance with a second preferred embodiment of the present invention. In accordance with the second preferred embodiment of the present invention, the probe 114 (in FIG. 1) is a 2-D probe and data point values are accumulated across the depth dimension to provide a visual cue of 3-D depth. Known systems employing 2-D probes concentrate on scanning and rendering complete volumes, however, in accordance with the present invention, while the full volume is scanned, only an area of interest is processed by the signal processor, using a variation of the process described with respect to the first preferred embodiment, while foregoing the traditional rendering process.

In the example shown in FIG. 5, a set of scan slices 502, 504, and 506 are generated by a 2-D probe 500. Preferably, but not necessarily, the slices are closer together than in a traditional volume scanning system, so that there is tight, uniform sampling of the medium both laterally and in depth. Those of ordinary skill in the art will recognize that the number of slices in FIG. 5 was chosen for ease of explanation only and the number of slices could be any desired number.

During image processing, the signal processor 124 (see FIG. 1) only processes a pre-selected window of beam-formed and detected acoustic data, for example from near the end of each scan line. The data outside the pre-selected window would be discarded, for example, by a window filter. In the Example shown in FIG. 5, three end data points on each line are selected for processing, e.g. summing or summing with weighting. Three exemplary data points are labeled on three exemplary lines, data points 508*a*, 508*b*, and 508*c* are labeled on a line in slice 502, while data points 510*a*, 510*b*, and 510*c* are labeled on a line in slice 504 and data points 512*a*, 512*b*, and 512*c* are labeled on a line in slice 506. Those of ordinary skill in the art will recognize that the use three data points per line, e.g. three levels of depth, is only exemplary in that any number of data points could be used to form the final image.

The standard depth control of the system determines where in the tissue acoustic lines "end", that is, the depth down to which echoes are recorded. The time window of data on each acoustic line is predetermined by the signal processor 124 to correspond to a selected thin depth range in the target within the scan depth. The signal processor 124 preferably generates a weighted sum of the data in each line's time window, with the weights of the summing coefficients descending in value with depth. The result is a rectangular data set representing a depth rendering of a flat, thin slab of tissue. Each point in the data set is placed in the output of a single scan line, which is passed to the display unit 130 (see FIG. 1). The display unit 130 is programmed to display the line data—in this case, point data, in a rectangular grid, with blending between points to smooth the image.

The process for obtaining weighted sum of data points in a window is very similar to the process described above with respect to the first embodiment, except that the accumulation for depth rendering is done in the depth, or radial direction instead of in the elevation direction. The accumulation process (or MAC) can be implemented by those of ordinary skill in the art using existing filtering hardware and software (for example a finite impulse response—"FIR", an infinite impulse response—"IIR," or an adaptive filter) in the system, which is used today for instance in standard 2D imaging to smooth or edge-enhance sector images. While the position and depth extent of the scan lines are the primary determinant of the rendered display, the rendering process itself is fixed.

Although a few enhancements to the second preferred embodiment of the present invention have described, it will be appreciated by those skilled in the art that other changes may be made without departing from the principles and spirit of the invention, the scope of which is defined in the claims and their equivalents. For example, by spreading the scan lines apart, the image extent is increased at the expense of spatial resolution. Further, by adjusting the depth of the scan lines, the level of the scan can be raised or lowered with respect to the probe face. The plane of the slab being viewed can also be adjusted by changing the angle of all scan lines in tandem, so that the plane of the slab can be tilted with respect to the probe face. Alternatively, the same effect can be achieved by adjusting the pre-selected time windows in a single regular progression from one scanned line to the next so that the flat slab is formed by the set of time windows is tilted with respect to the probe face. Finally, the slab can be generated in varying shapes, such as a sphere or curved surface, by varying the position of the time windows according to the position of each scan line.

Although a few embodiments of the present invention have been shown and described, it would be appreciated by those skilled in the art that changes may be made in these embodiments without departing from the principles and spirit of the invention, the scope of which is defined in the claims and their equivalents.

The present ultrasound system uses standard, or slightly modified existing 2D display hardware and software to produce the an image having 3-D depth cues. No sophisticated rendering hardware or software is needed to yield the image. Thus, an image having 3-D depth cues can be provided without incurring the cost of an integrated rendering workstation. Rather, the rendered view's 3-D characteristics are controlled by the placement of the acoustic scan lines, indexing of lines which are added, optional weighting coefficients in the additions, and the selection of time windows in the acoustic lines.

What is claimed is:

1. An ultrasound system for producing real-time 3-D images without dedicated rendering hardware, comprising:
   a probe;
   a display; and
   a control unit that uses the probe to produce a plurality of slices of data, wherein each slice comprises a plurality of lines of data points, and combines data points from matched lines across the slices so as to create an image on the display which provides an illusion of depth.

2. The ultrasound system of claim 1 wherein the control unit combines the data points using a digital filter.

3. The ultrasound system of claim 1 wherein the plurality of slices of data is X slices of data where $3 \leq X \leq 15$.

4. The ultrasound system of claim 1 wherein the plurality of slices of data is X slices of data where $6 \leq X \leq 12$.

5. The ultrasound system of claim 4 wherein digital filter is an FIR type filter.

6. The ultrasound system of claim 4 wherein digital filter is an IIR type filter.

7. The ultrasound system of claim 4 wherein digital filter is an adaptive type filter.

8. The ultrasound system of claim 1 wherein the control unit combines the data points by weighting the matched data points based on a predefined relationship and accumulating the matched weighted data points together.

9. The ultrasound system of claim 8 wherein data points in slices in a foreview of the image receive a heavier weighting than data points in slices further displaced from the foreview so as to create a visual effect of dimming.

10. The ultrasound system of claim 1 wherein the control unit linearly combines the data points by accumulating matched data points on lines from the plurality of slices.

11. The ultrasound system of claim 1 the control unit matches and combines the data points by indexing lines in each slice, adjusting the index of lines in at least one slice based on a desired rotation and accumulates data points from similar depths on lines with matching indexes in the plurality of slices.

12. The ultrasound system of claim 1 wherein the each slice comprises a plurality of lines and the control unit adjusts the placement of the lines to produce a desired effect in the image.

13. The ultrasound system of claim 12 wherein the control unit adjusts placement of lines by controlling the spacing of lines so as to have non-uniform spacing to produce apparent perspective with a sense of depth in the image.

14. The ultrasound system of claim 1 wherein each control unit causes each slice to be shaped as a sector scan and wherein each slice shares a common apex.

15. The ultrasound system of claim 1 wherein each control unit causes each slice to be shaped as a sector scan and wherein each slice has a different apex.

16. The ultrasound system of claim 1 wherein each control unit causes each slice to be shaped as a rectangular scan and wherein each rectangular scans share a common side.

17. The ultrasound system of claim 1 wherein each control unit causes each slice to be shaped as a rectangular scan and wherein none of the rectangular scans share a common side.

18. The ultrasound system of claim 1 wherein each control unit causes each slice to be shaped as a trapezoidal scan and wherein each trapezoidal scan shares a common side.

19. The ultrasound system of claim 1 wherein each control unit causes each slice to be shaped as a trapezoidal scan and wherein none of the trapezoidal scans share a common side.

20. The ultrasound system of claim 1 wherein the control unit utilizes a persistence routine to combine the slices.

21. An ultrasound system for producing real-time 3-D images without dedicated rendering hardware, comprising:
a probe;
a display;
a control unit that uses the probe to capture a plurality of lines of data points thereby obtaining a volume of data points; and
a signal processor that filters the volume of data points so as to select data points in a certain depth range and combines the data points on each line of data points within the depth range so as to create an image on the display which provides an illusion of depth.

22. The ultrasound system of claim 21 wherein the control unit combines the data points using a digital filter.

23. The ultrasound system of claim 21 wherein the control unit weights each of the data points prior to combining.

24. The ultrasound system of claim 23 wherein the control unit combines and weights the data points using a digital filter.

25. The ultrasound system of claim 24 wherein digital filter is an FIR type filter.

26. The ultrasound system of claim 24 wherein digital filter is an IIR type filter.

27. The ultrasound system of claim 24 wherein digital filter is an adaptive type filter.

28. The ultrasound system of claim 21 wherein the depth and rotation of the image is user controllable.

29. The ultrasound system of claim 21 wherein the lines of data points are parallel.

30. The ultrasound system of claim 21 wherein the lines of data points are not parallel.

31. The ultrasound system of claim 21 wherein the control unit combines the data points by weighting each data point based on a predefined relationship and accumulating the weighted data points together.

32. The ultrasound system of claim 31 wherein data points in slices closer to a foreview in the image receive a heavier weighting than data points in slices further removed from the foreview so as to create the visual effect of dimming.

33. An ultrasound system for producing real-time 3-D images without dedicated volume rendering hardware comprising:
a probe;
a display; and
control means for producing a plurality of slices of data, wherein each slice comprises a plurality of lines of data points, and combining data points from matched lines across the slices so as to create an image on the display which provides an illusion of depth.

34. A method for creating 3-D ultrasound images in real-time without a need for dedicated rendering hardware comprising:
using probe to produce a plurality of slices of data wherein each slice comprises a plurality of lines of data points; and
combining data points from matched lines across the slices so as to create an image on the display which provides an illusion of depth.

35. A method, as set forth in claim 34, wherein the step of combining comprises:
weighting each data point based on a desired viewpoint and accumulating the weighted data points together.

36. A method, as set forth in claim 34, wherein the step of combining comprises:
indexing lines in each slice, adjusting the index of lines in at least one slice, based on a desired rotation, and accumulating data points from similar depths on lines with matching indexes in the plurality of slices.

37. A method for creating 3-D ultrasound images in real-time without a need for dedicated rendering hardware comprising:
using probe to produce a plurality of slices of data, each slice of data having a plurality of lines of data points;

selecting data points in a certain depth range from each of the lines of data; and combining the data points on each line of data points within the selected depth range so as to create an image on the display which provides an illusion of depth.

38. The method, as set forth in claim 37, wherein the certain depth range is individually selected for each line of data so as to provide tilt.

* * * * *